United States Patent [19]

Kwak

[11] Patent Number: 5,128,771
[45] Date of Patent: Jul. 7, 1992

[54] METHOD FOR CONTROLLING THE SAMPLING DIRECTION, SEQUENCE AND POSITION OF COLOR DATA IN A FRAME MEMORY IN A COLOR VIDEO LINE PRINTER

[75] Inventor: Heui-kuk Kwak, Suwon, Rep. of Korea

[73] Assignee: Samsung Electronics Co., Ltd., Suwon, Japan

[21] Appl. No.: 735,324

[22] Filed: Jun. 24, 1991

[30] Foreign Application Priority Data

Jul. 27, 1990 [KR] Rep. of Korea ............... 90-11503

[51] Int. Cl.⁵ .................. H04N 1/21; H04N 1/23; H04N 1/46
[52] U.S. Cl. .......................... 358/296; 358/78
[58] Field of Search .................. 358/78, 444, 296; 364/115, 116; 340/798, 799, 800

[56] References Cited

U.S. PATENT DOCUMENTS 4,896,146 1/1990 Narumiya ..................... 358/78

Primary Examiner—Benjamin R. Fuller
Assistant Examiner—Scott A. Rogers
Attorney, Agent, or Firm—Robert E. Bushnell

[57] ABSTRACT

A printing control method for a video color printer includes the steps of: changing sampling direction so that a line memory inputs column samples among one frame data of a frame memory whenever printing is completed; sequentially designating one column sample position from left to right or vice versa according to the direction designated in the sampling direction changing step whenever one frame data is read out from said frame memory; and designating the position of unit samples so that said line memory sequentially inputs the column samples designated in the column sample designating step whenever one horizontal scan line data is read out. The method is advantageous in preventing paper's curl and dislocation of color by controlling an enabling signal of the line memory in a video color printer to allow reciprocative printing.

2 Claims, 4 Drawing Sheets

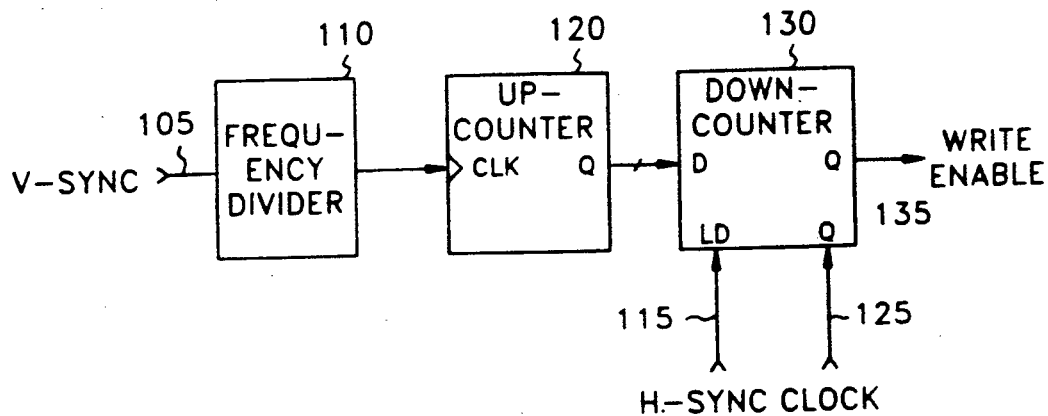
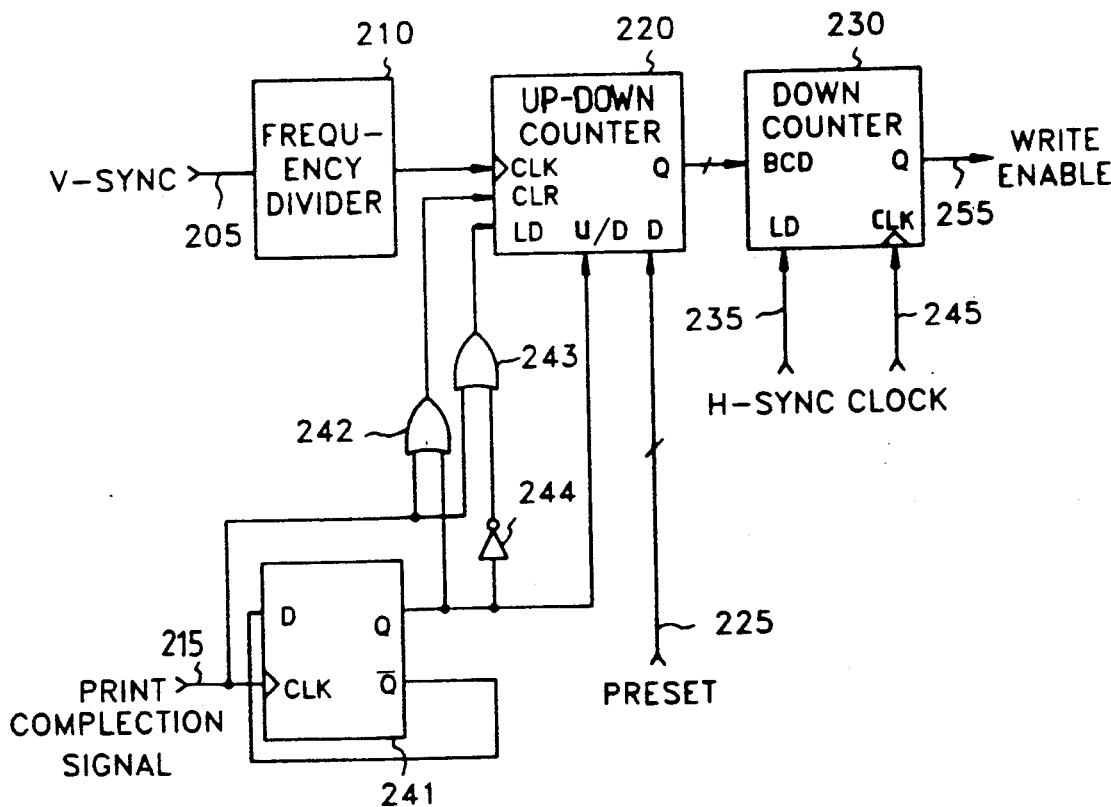

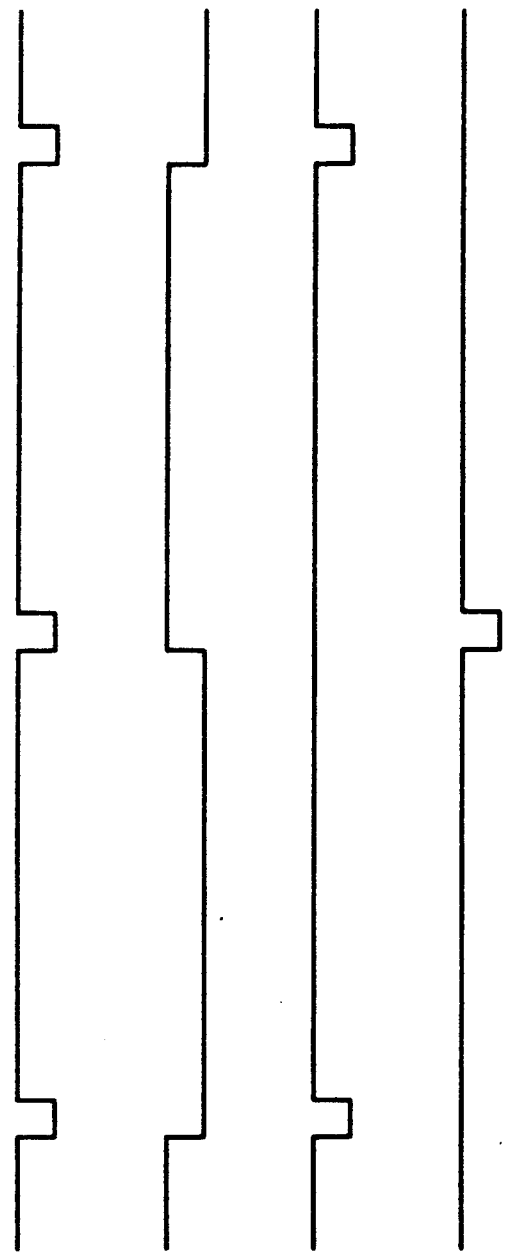

METHOD FOR CONTROLLING THE SAMPLING DIRECTION, SEQUENCE AND POSITION OF COLOR DATA IN A FRAME MEMORY IN A COLOR VIDEO LINE PRINTER

BACKGROUND OF THE INVENTION

The present invention relates to a printing control method for controlling an enable signal of a line memory so as to allow reciprocative printing in a video printer.

A video printer is to print a picture recorded by the instant capture of a video signal, or a picture recorded by a recorder such as a still camera and reproduced on a monitor.

Referring to FIG. 1, video decoder 10 of a video color printer separates the R, G, and B analog signals from a video signal input from video input port 5, and the horizontal and vertical synchronous H-sync and V-sync signals. Upon receiving a memory instruction signal from memory instruction input port 15, memory controller 70 supplies a sampling pulse to analog-to-digital converter 20 corresponding to the separated H-sync and V-sync signals. Analog-to-digital converter 20 converts the R, G, and B analog signals from decoder 10 to R, G, and B digital signals corresponding to the sampling pulse from memory controller 70. Frame memory 30 stores the R, G, and B signals from analog-to-digital converter 20 in a storage location corresponding to a write address designated by memory controller 70. Upon receiving an instruction input signal from print instruction input port 25, a printing controller 80 simultaneously applies a read address to frame memory 30, designates a write address in line memory 31, and selects a memory selection switch.

Meanwhile, R, G, and B signals should be converted to yellow Y, cyan C and magenta M in order to be printed on paper. The R, G, and B signals recorded in frame memory 30 are sequentially recorded in line memory 31 by lines by memory selection switch 40, and the data recorded in line memory 31 is transmitted to controller 50 by printing controller 80. Controller 50 converts the R, G, and B signals from line memory 31 to Y, M, and C signals sequentially and at the same time, performs color correction and resistance correction to reduce the resistive deviation of each heat generating element of a printing head in order to compensate the error of density conversion in accordance with the correlation between the properties of the paper used and amount of heat generated by a head, then, applies the converted and compensated Y, M, and C data to the printing head of printing portion 60 in the sequence of Y, M, and C. The data is printed by lines by the printing head of printing portion 60, which is the completion of one frame printing.

Digital-to-analog converter 21 converts the R, G, and B digital signals of frame memory 30 to R, G, and B analog signals and supplies them to encoder 90. Encoder 90 converts the R, G, and B signals converted by digital-to-analog converter 21 to a composite video signal and supplies it to monitor 100. While the one frame picture is being printed by the printing portion, monitor 100 displays the picture which is being printed.

In addition, a printing head of printing portion 60 prints by lines from left to right because the number of vertical sampling is constant but the number of horizontal sampling is variable. Thus, line memory 31 stores one column data during reading out of one frame data from frame memory 30. At this time, printing controller 60 should generate a write enabling signal in order that line memory 31 stores the one column data among one frame data of frame memory 30.

Referring to FIG. 2, frequency divider 110 divides by two a vertical synchronous signal input via vertical synchronous signal input port 105 and supplies the two-divided vertical synchronous signal to up-counter 120. Whenever the vertical synchronous signal divided by two by frequency divider 110 is input to a clock port CLK, up-counter 120 counts a value by increasing it by "1", and supplies the counted value to the input port D of down-counter 130. Down-counter 130 inputs the counted value from up-counter 120 during the horizontal blanking period of a horizontal synchronous signal input via a horizontal synchronous signal input port 115. Whenever a clock signal is applied via clock port 125 during the horizontal scan period of a horizontal synchronous signal, down-counter 130 counts the input values by decreasing it by "1" until the input value becomes "0", and applies a write enabling signal in a predetermined logic state to line memory 31.

Therefore, when the output of up-counter 120 is "1", data (1, L1), (2, L1), (3, L1), ..., (525, L1) of first column in FIG. 3 is applied and printed in printing portion 7. When the output of up-counter 120 is "2", data (1, L2), (2, L2), (3, L2), ..., (525, L2) of second column is printed in printing portion 7. According to the sequence, as data (1, L600), (2, L600), (3, L600), ..., (525, L600) of 600th column is printed, printing of one color is completed.

As printing of one color is completed, a platen drum is rotated two times faster to make paper return to the initial position. Then, printing is carried out again to sequentially print yellow, magenta, and cyan in the same direction, then printing is completed.

As described above, after the completion of printing, the ordinary printing controller rotates the platen drum two times faster to make paper return to the initial position. Then, printing begins again. If paper is wound on the drum, the one-direction printing may cause dislocation of color because of paper's curl and incorrect initial setting.

SUMMARY OF THE INVENTION

Therefore, it is an object of the present invention to provide a printing control method for preventing paper's curl and incorrect initial setting.

To accomplish the object, in a video color printer comprising a frame memory for storing one frame color signals, and repeatedly reading out the stored color signals from left to right and from top to bottom, a line memory for storing one column color signal whenever one frame color signals are read out from the frame memory, and a printing means for printing the color signals stored in the line memory, the printing control method of the present invention comprises the steps of: changing sampling direction so that the line memory inputs column samples among one frame data of the frame memory whenever printing is completed; sequentially designating one column sample position from left to right or vice versa according to the direction designated in the sampling direction changing step whenever one frame data is read out from the frame memory; and designating the position of unit samples so that the line memory sequentially inputs the column samples designated in the column sample designating step whenever one horizontal scan line data is read out.

BRIEF DESCRIPTION OF THE DRAWINGS

The above object and other advantages of the present invention will become more apparent by describing in detail a preferred embodiment of the present invention with reference to the attached drawings in which:

FIG. 2 is a detailed circuit diagram of an enabling signal generator for use of a line memory of the printing controller shown in FIG. 1;

FIG. 4 is a detailed circuit diagram of an enabling signal generator for a line memory in accordance with the present invention; and FIGS. 5A through 5D are waveforms present at various stages of the circuit shown in FIG. 4.

DETAILED DESCRIPTION OF THE INVENTION

Figure 1:
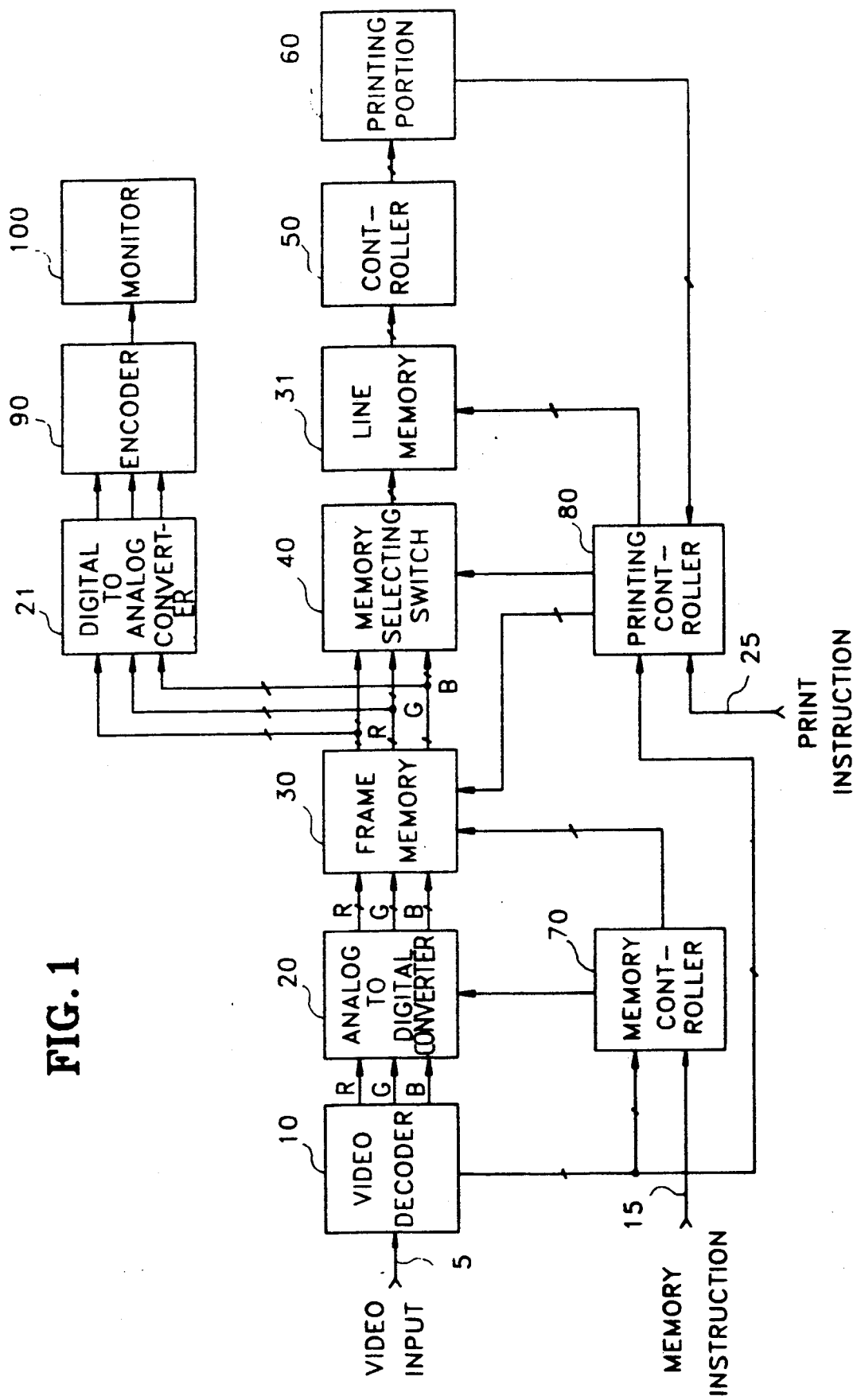
FIG. 1 is a block diagram of a video color printer.
Figure 3:
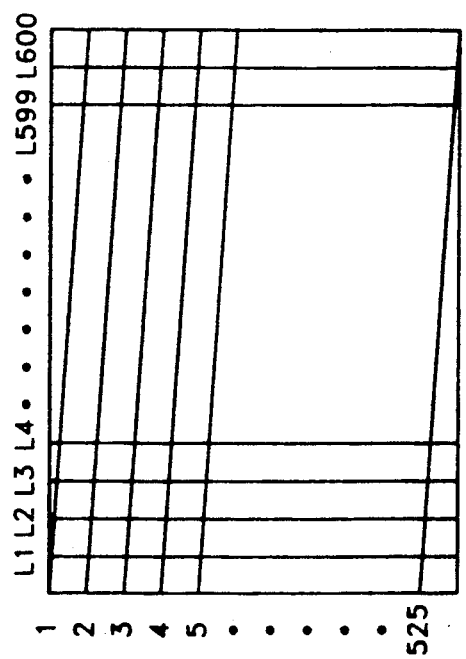
FIG. 3 illustrates the relation between picture scanning of a video signal and sampling location of a printing line.

Referring to FIG. 4, first input port 205 is coupled to decoder 10 shown in FIG. 1 to input a vertical synchronous signal. First input port 205 is coupled to the input port of frequency divider 210. The output port of frequency divider 210 is coupled to clock port CLK of up-down counter 220. Output port Q of up-down counter 220 is coupled to input port D of down-counter 230. Output port Q of down-counter 230 is coupled to output port 255. Output port 255 is coupled to a write enabling port (not shown) of line memory 31 shown in FIG. 1. To input a print completion signal, second input port 215 is coupled to printing portion 60 shown in FIG. 1 or a microcomputer (not shown) for controlling the whole system. Second input port 215 is coupled to clock port CLK of flip-flop 241, and one input port of OR gates 242 and 243. Noninverting output port Q of flip-flop is coupled to the other input port of OR gate 242, input port of inverter 244, and up/down control port U/D of up-down counter 220. The output port of inverter 244 is coupled to the other input port of OR gate 243. The output port of OR gate 242 is coupled to clear port CLR of up-down counter 220. The output port of OR gate 243 is coupled to load port LD of up-down counter 220. Flip-flop 241 has a feedback loop which is connected from inverting output port *Q to input port D. Third input port 225 is coupled to an initial value setting portion (not shown) or a microcomputer (not shown) in order to input a preset value which designates a sample at the horizontally right end. Third input port 225 is coupled to input port D of up-down counter 220. Fourth input port 235 is coupled to decoder 10 shown in FIG. 1 to input a horizontal synchronous signal. Fourth input port 235 is coupled to load port LD of down-counter 230. Fifth input port 245 is coupled to a clock source to input a clock signal. Fifth input port 245 is coupled to the clock port CLK of down-counter 230.

FIG. 5A is a waveform of a print completion signal supplied to second input port 215, FIG. 5B is a waveform of an output signal outputted from noninverting output port Q of flip-flop 241, FIG. 5C is a waveform of an output signal of OR gate 242, and FIG. 5D is a waveform of an output signal of OR gate 243.

Detailed descripton of the present invention follows with reference to FIGS. 1 and 3 through 5C.

Turning to FIG. 4, frequency divider 210 frequency-divides a vertical synchronous signal inputted via first input port 205, and generates a two-divided vertical synchronous signal. While outputting an up-down mode control signal in high logic state via noninverting output port Q, flip-flop 241 inverts the up-down mode control signal in high logic state of noninverting output port Q to a signal in low logic state as shown in FIG. 5B, when a print completion signal in the low logic state as shown in FIG. 5A is applied to clock port CLK via second input port 215. OR gate 242 logically sums the up-down mode control signal in low logic state from noninverting output port Q of flip-flop 241, and the print completion signal from second input port 215, and generates the logic signal as shown in FIG. 5C. Up-down counter 220 resets an output value to "0" by the logic signal in low logic state applied to clear port CLK from OR gate 242. While the up-down mode control signal in low logic state is applied from noninverting output port Q of flip-flop 241 to an up-down control port, up-down counter 220 counts a value according to the two-divided vertical synchronous signal applied from frequency-divider 210 to clock port CLK, and generates count values which increase by "1" from "0" to "600". Whenever a horizontal synchronous signal is applied to load port L/D via fourth input port 235, down-counter 230 inputs the counted values from up-down counter 220 via input port D. Down-counter 230 counts the counted values inputted by a clock signal applied to clock port CLK via fifth input port 245 by decreasing by "1", then, generates a write enabling signal in low logic state when the count value becomes "0". The write enable signal generated from down-counter 230 is supplied to line memory 31 shown in FIG. 1 via output port 255. When the count value of up-down counter 220 is "1", line memory 31 shown in FIG. 1 inputs data of samples (1, L1), (2, L1), (3, L1), . . . , (525, L1) of FIG. 3 according to the write enable signal generated from down-counter 230 shown in FIG. 4, and supplies the data to printing portion 60 via controller 50. Then, printing portion 60 prints L1 column data of line memory 31 inputted via controller 50. When the count value of up-down counter 220 shown FIG. 4 is "2", line memory 31 shown in FIG. 1 inputs data of samples (1, L2), (2, L2), (3, L2), . . . , (525, L2) of FIG. 3, and printing portion 60 prints L2 column data. According to the sequence, print portion 60 prints data until the L600 column to complete the printing of one color.

Meanwhile, in FIG. 4, while outputting the up-down mode control signal in low logic state via noninverting output port Q, flip-flop 241 inverts the up-down mode control signal in low logic state of noninverting output port Q to a signal in high logic state as shown in FIG. 5B, when a print completion signal in low logic state as shown in FIG. 5A is applied to clock port CLK via second input port 215. OR gate 243 logically sums the up-down mode control signal in high logic state from noninverting output port Q of flip-flop 241 inputted via inverter 244, and the print completion signal from second input port 215, and then generates a logic signal as shown in FIG. 5D. Up-down counter 220 sets an output value to "600", the preset value of third input port 225, according to the logic signal in a low logic state applied from OR gate 243 to load port LD. While the up-down mode control signal in a high logic state is applied from noninverting output port Q of flip-flop 241 to up-down control port U/D, up-down counter 220 counts a value by decreasing it by "1" according to the two-divided vertical synchronous signal applied from frequency-divided 210 to clock port CLK, and generates counted values which decrease by "1" from "600" to "0". Down-counter 230 inputs the counted values from up-down counter 220 via input port D whenever a horizontal synchronous signal is applied to load port L/D via fourth input port 235.

Down-counter 230 counts the count values by decreasing it by "1" according to the clock signal applied to clock port CLK via fifth input port 245. When the counted value becomes "0", down-counter 230 generates a write enable signal in a low logic state. The write enable signal generated from down-counter 230 is supplied to line memory 31 shown in FIG. 1 via output port 255. When the count value of up-down counter 220 becomes "600", line memory 31 shown in FIG. 1 inputs data of samples (1, L600), (2, L600), (3, L600), . . . , (525, L600) in FIG. 3 according to the write enable signal from down-counter 230 shown in FIG. 4, and supplies the data to printing portion 60 via controller 50. Then, printing portion 60 prints the L600 column data from line memory 31 inputted via controller 50. When the counted value of up-down counter 220 shown in FIG. 4 becomes "599", line memory 31 shown in FIG. 1 inputs data of samples (1, L599), (2, L599), (3, L599), . . . , (525, L599) of FIG. 3, and printing portion 60 prints the L599 column data. According to the sequence, printing portion 60 prints data until L1 column to complete the printing of another color. As mentioned above, the count mode and initial value of up-down counter 220 can be changed to allow reciprocative printing.

As described above in detail, the present invention is advantageous in preventing paper's curl and dislocation of color by controlling an enable signal of a line memory in a video color printer to allow reciprocative printing.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. In a video color printer comprising a frame memory for storing data corresponding to color signals of one image frame, and repeatedly reading out the stored data from left to right and from top to bottom, a line memory for storing of data corresponding to a color signal whenever one frame of data is read out from the frame memory, and a printing means for printing the data stored in the line memory, a printing control method comprises the steps of:

changing a sampling direction so that said line memory inputs column data samples from one frame of data stored in said frame memory whenever printing is completed;

sequentially designating one column data sample position from left to right or vice versa according to the sampling direction designated in the sampling direction changing step whenever one frame of data is read out from said frame memory; and designating the position of column data samples so that said line memory sequentially inputs column data samples of the column designated in the sequential designating whenever one horizontal scan line of data is read out from said frame memory.

2. A printing control method as claimed in claim 1, wherein the start position of line samples is also designated when the sampling direction is changed in said sampling direction changing step.

* * * * *

UNITED STATES PATENT AND TRADEMARK OFFICE
CERTIFICATE OF CORRECTION

PATENT NO. : 5,128,771

DATED : 7 July 1992

INVENTOR(S) : Heui-kuk KWAK

It is certified that error appears in the above-identified patent and that said Letters Patent is hereby corrected as shown below:

Title page, item [22] Filing Date should read

-- July 24, 1991 --.

Signed and Sealed this

Twenty-fourth Day of August, 1993

Attest:

BRUCE LEHMAN

Attesting Officer        Commissioner of Patents and Trademarks